United States Patent [19]

DeGideo

[11] Patent Number: 4,457,597

[45] Date of Patent: Jul. 3, 1984

[54] SELF CLEANING SIDE VIEW MIRROR

[76] Inventor: Thomas L. DeGideo, 2705 Veser La., Willow Grove, Pa. 19090

[21] Appl. No.: 454,277

[22] Filed: Dec. 29, 1982

[51] Int. Cl.³ .............................................. B60S 1/14
[52] U.S. Cl. ................................. 350/582; 15/250 B; 15/250.29
[58] Field of Search .............. 350/582, 584; 15/250 B, 15/250.29, 250.24

[56] References Cited

U.S. PATENT DOCUMENTS

| | | | |
|---|---|---|---|
| 3,158,935 | 12/1964 | Rosenthal | 350/582 |
| 3,526,920 | 9/1970 | Boyanich | 15/250.29 |
| 3,685,087 | 8/1972 | Pittman | 350/582 |
| 3,866,258 | 2/1975 | DeGraw | 350/582 |
| 4,037,786 | 7/1977 | Medearis et al. | 15/250.29 |
| 4,339,169 | 7/1982 | Addison | 350/582 |

Primary Examiner—Jon W. Henry
Attorney, Agent, or Firm—John J. Simkanich

[57] ABSTRACT

A side view mirror which includes a frame and reflective center portion has a top and bottom end cap incorporated as an integral part of the structure and a pair of guide rods extending between the top and bottom end caps, on either side of the mirrored center portion, having a cross bar supported between the guide rods and a rubber wiper and handle positioned on the cross bar, whereof the top end cap provides a holder mechanism for keeping the rubber wiper under said top end cap when not in use.

10 Claims, 7 Drawing Figures

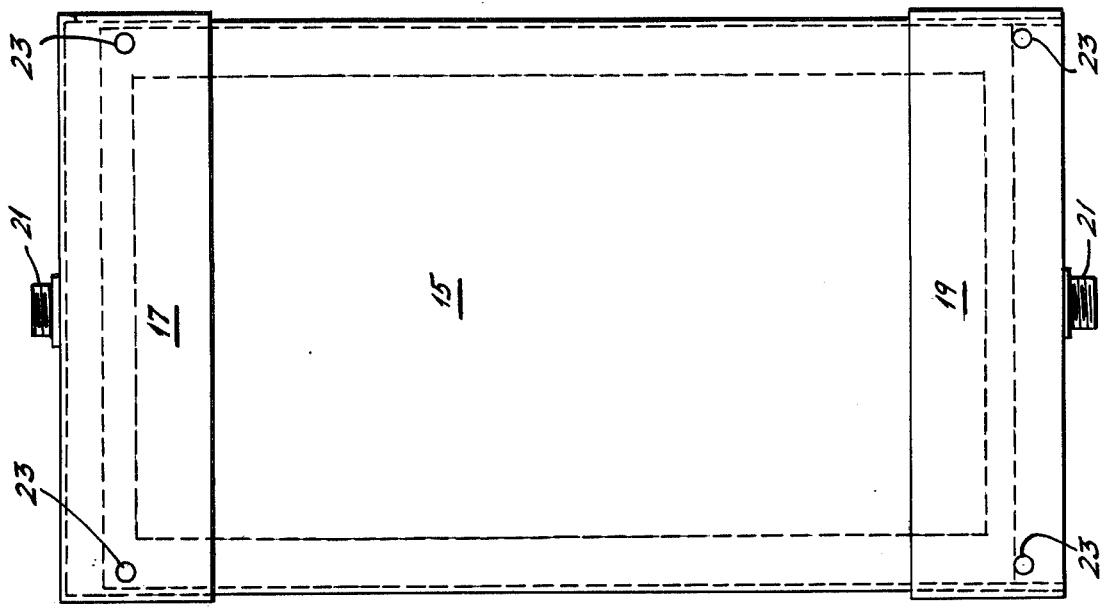
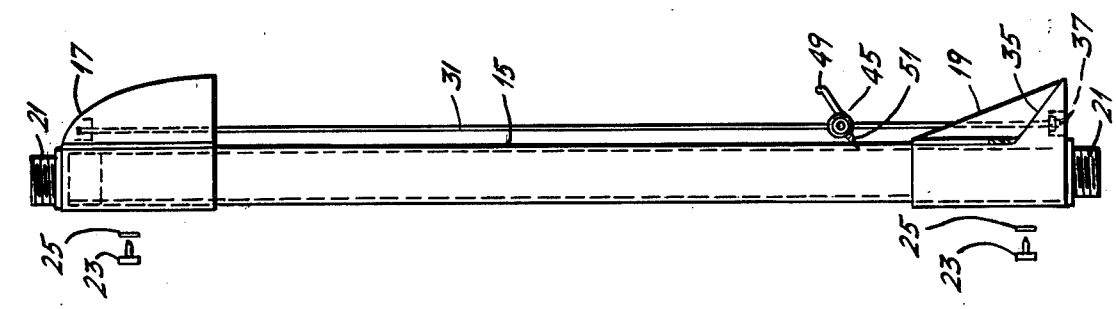
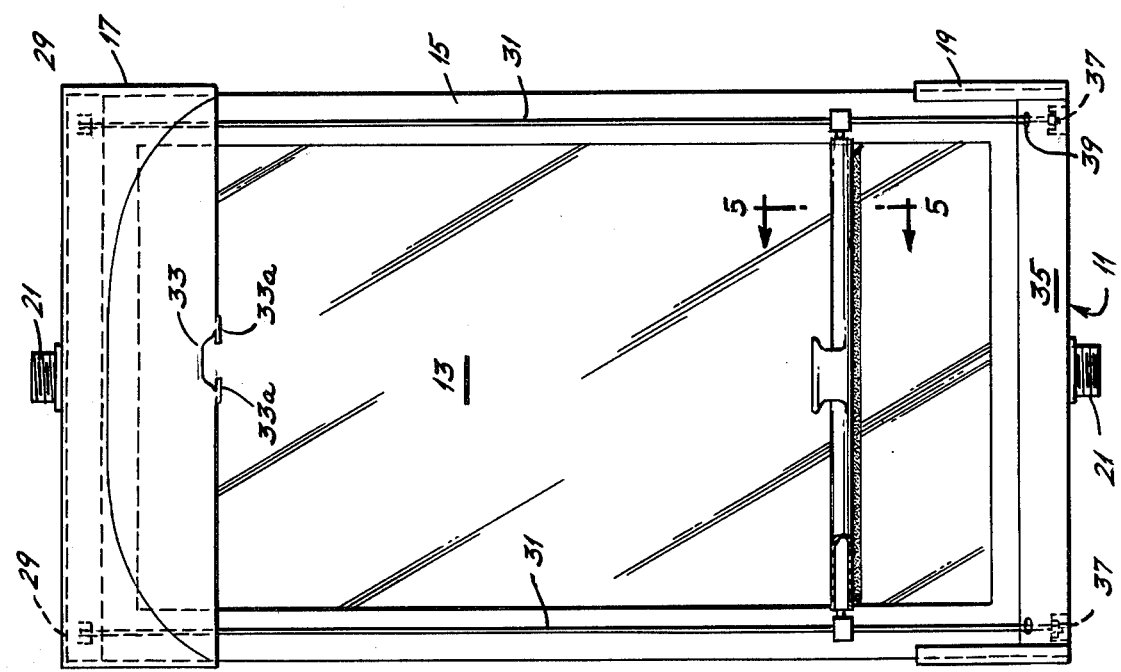

SELF CLEANING SIDE VIEW MIRROR

BACKGROUND OF THE INVENTION

This invention relates to rear view side door mirror as used on trucks and tractor trailers, more specifically it relates to improvements to such side view mirrors which incorporate a wiping blade device for cleaning such mirror(s) of rain and snow.

Vander Zee, U.S. Pat. No. 2,913,754, shows a rectangular side view mirror with a windshield wiping type device installed thereon. The wiping device of Vander Zee oscillates in an arc path similar to an automobile or truck windshield wiper, and takes up much of the viewing area.

Prince, U.S. Pat. No. 3,855, 661, shows a rectangular side view mirror with a power operated wiper mechanism installed in front of it. The wiper arm of this mechanism is driven along a horizontally extending rod so that the wiper blade wipes in a reciprocating fashion. A substantial and bulky structure is needed.

Wagenhofer, U.S. Pat. No. 3,968,537, shows a rectangular side view mirror with a motorized wiping device including a blade supported from a rod which is moved in a reciprocating fashion in a horizontal direction.

Laprairie, U.S. Pat. No. 3,612,647, shows a partially enclosed semicircular housing with a motor to rotate the housing and wipe the rear view mirror across a blade fixed to the housing.

Pittman, U.S. Pat. No. 3,685,087, shows a wiper blade supported on an arm which rides in a track along the side of the rear view mirror housing. A chain drive mechanism located within the mirror housing attaches to the arm and causes the wiper arm to reciprocate vertically across the length of the mirror.

DeGraw, U.S. Pat. No. 3,866,258, shows a wiper assembly mounted to a rear view mirror including a rod on which a wiper blade is mounted. This rod is formed as part of U-shaped elements which are driven by a hydraulic piston in one direction and caused to return by springs in the opposite direction.

Jones, U.S. Pat. No. 4,212,091, shows a structure similar to DeGraw but which utilizes a pair of hydraulic cylinders for driving the wiper blade support rods in either direction to effect the reciprocating wiping motion.

Layton, U.S. Pat. No. 4,306,328, shows a wiper apparatus for a side view mirror which incorporates a pair of chains and sprocket assemblies positioned on a mirror frame for driving a wiper support arm in a reciprocating fashion. The chains and sprocket drive assemblies are incorporated as part of the mirror side frames with the wiper support arm extending between.

Legrand, French Patent No. 2,360,446, shows a mechanically cleaned and demisted rear view side mirror. This mirror structure has a rod which is mounted between a pair of cables driven in a reciprocating fashion by an electric motor mounted within the mirror housing. The wiper blade is driven vertically by its cable attachment in a reciprocating fashion over the mirrored surface. A top and bottom hood covers the top and bottom positioned pulleys.

The self cleaning mirrors shown in the prior art provide structures which are undesirable in that they generally are heavy, expensive to build, cumbersome and bulky. Their bulk reduces the field of vision of the motor vehicle operator. Moreover, such motorized designs of necessity have to sell in the marketplace at a much higher price than a simple side view mirror.

An object of the present invention is to provide a self cleaning side view mirror which is simple of construction and economical to manufacture.

A second objective of this invention is to provide such a self cleaning side view mirror with a relatively narrow profile.

A third object of this invention is to provide such a self cleaning mirror with a wiper guide which is easy to operate and reduces the likelihood of jamming, and which is capable of lifting the wiper blade off of the mirror surface when not in use.

A further object of this invention is to provide a structure which will protect the wiper blade from the elements when it is in the inactive position.

An even further object of this invention is to provide a combination structure which utilizes a standard, commercially available side view mirror as its base component.

SUMMARY OF THE INVENTION

The objects of this invention are realized in a combination structure which incorporates protective end caps over the top and bottom of a commercially available metal encased side view mirror. The end caps include a bolt structure for mounting the mirror to commercially available door brackets.

A pair of metal rods are attached between the end caps to extend, one each, on either side of the mirror frame. A cross bar is mounted for operation between the pair of metal rods, and a plastic sleeve is mounted for operation on the cross bar. This plastic sleeve carries a rubber wiper and a handle.

The top end cap includes a holding mechanism for keeping the cross bar assembly with its plastic sleeve and rubber wiper at the top of the mirror, under the top end cap.

DESCRIPTION OF THE DRAWINGS

The structure, operational features and advantages of this invention will be readily understood from a reading of the following detailed description in conjunction with the accompanying drawings in which like numerals refer to like elements and in which:

FIG. 1 is a front elevation of the mirror invention;

FIG. 2 is a back elevation of the invention;

FIG. 3 is a side elevation of the invention;

DETAILED DESCRIPTION OF THE INVENTION

Figure 4:
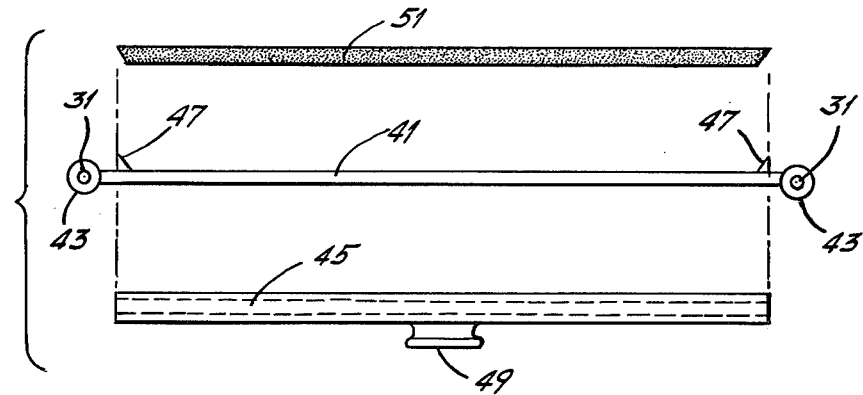
FIG. 4 shows a breakaway view of the cross bar plastic sleeve and rubber wiper components of the structure.

A self cleaning side view mirror 11 of the present invention FIG. 1, is manually operated and includes a reflective mirror surface 13 having a metal encasement for frame 15. This mirror and frame 13, 15, is of a type which is commercially available and normally supplied as side view door mirrors on motor vehicles, including trucks. It may be rectangular, oval or round shaped.

The metal casing 15 extends around the back of the mirrored surface 13 to protect this surface, FIGS. 1, 2.

Mounted to the top and bottom of the mirror 13 is a top end cap 17 and a bottom end cap 19, respectively. The top end cap 17 is an enclosed elongate structure which can be made of metal, plastic or nylon. This top end cap 17 provides a hood for the mirrored surface 13 and includes a centrally positioned bolt 21 extending upwardly from the outer surface which can be used for mounting the mirror structure 11 to mounting brackets extending from the door of an automobile or truck. The top end cap 17 is secured to the back of the mirror casing 15 by means of a plurality of self threading screws 23 and lock washers 25. To seat flush against the back of the mirror structure 11 and to extend a distance beyond the mirrored face 13. The outside front face of this top end cap 17 can have a curved surface 27, FIG. 3.

Extending downwardly from the inside surface of the top end cap 17 is a pair of threaded fixtures 29, one of each being located near each end for positioning and receiving the threaded ends of each of a pair of metal guide rods 31 so that each such guide rod 31 extends along and in front of its respective vertical outside frame portion of the metal casing 15. A rubber insert 33 including a pair of juxtaposed rubber extension fingers 33a are positioned at a cut-out in the front lower edge of the top end cap 17 at the middle location thereof.

The bottom end cap 19 is rectangular in shape and like the top end cap 17 has a generally elongate configuration. This bottom end cap 19 does not have a closed front lip but has a downwardly sloping surface 35 which carries off moisture from the mirrored surface 33. As with the top end cap 17, the bottom end cap 19 is secured by a pair of screws 23 and lock washers 25 to abut the back of the metal casing 15. A downwardly protruding threaded bolt 21 extends from the center portion of the outside surface of this bottom end cap 19. This bottom end cap 19 can be made of a material similar to the top end cap 17, but need not be so.

The pair of guide rods 31 extend through drilled holes 39 in the downwardly sloping surface 35 of the bottom end cap 19 to be each secured by an individual threaded nut 37. The drilled holes 39 in the downwardly sloping surface 35 are positioned so that the guide rods 31 extend parallel to one another.

Suspended between the guide rods 31 is a cross bar 41. Cylindrical bearing retaining caps 43 each containing a plurality of ball bearings which ride against the guide rods 31 are mounted on each end of the cross bar 41 for allowing the cross bar to be easily moved along the pair of guide rods 31. This cross bar 41 has a round cross section and has a cylindrical tube-like plastic sleeve 45 mounted on it for rotation. A detente 47 can be positioned near either end of the cross bar 41 for retaining the sleeve 45 in a center position.

Figure 5:
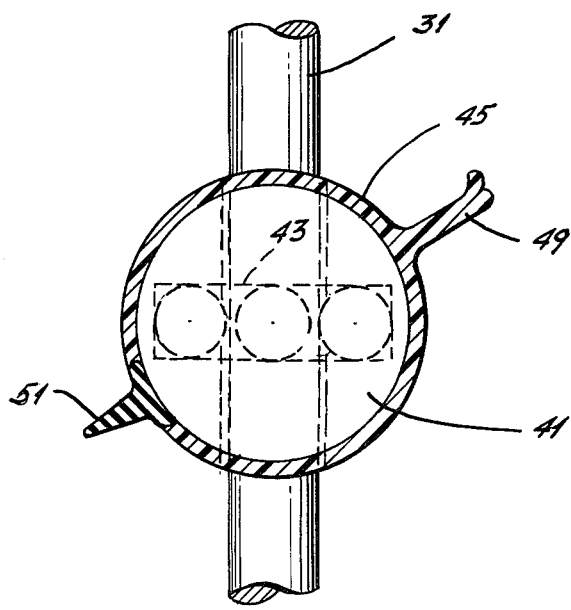
FIG. 5 is a cross-sectional view of the cross bar plastic sleeve and rubber wiper components as shown in FIG. 1.

This sleeve 45, FIGS. 4 and 5, carries a flexible handle 49 near its center and a rubber wiper 51 extending the length of the sleeve 45 and positioned about diametrically opposite from the handle 49.

The handle 49 is of a size and shape which will be easily be grasped by a vehicle operator and which can be retained within the rubber insert 33 by the protruding fingers 33a thereby storing the wiper out of the field of vision of the mirror when not in use. In its stored positions the wiper 51 is protected from the elements by the top end cap 17 extension and is slightly rotated to lift from the mirrored surface because of the handle 49 storage position within the insert 33.

The structure of the invention permits for a relatively narrow profile and an uncluttered mirror surface. The cleaning mechanism is reliable to operate and relatively light in weight.

Many changes can be made in the above described structure without departing from the intent and scope thereof. It is therefor intended that the disclosure be interpreted as illustrative and not be taken in the limiting sense.

Figure 6:
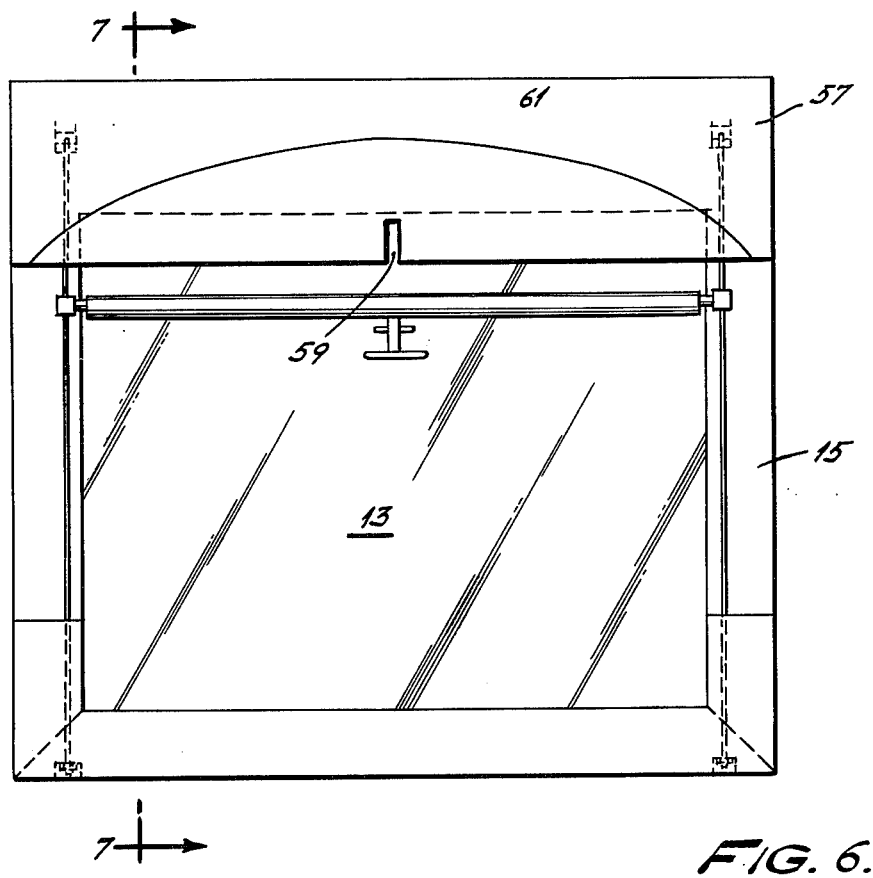
FIG. 6 shows an alternate embodiment for the mirror invention.
Figure 7:
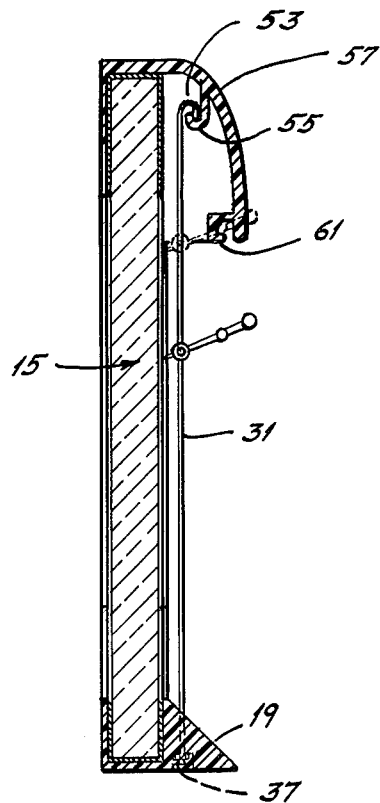
FIG. 7 shows a cross-section view as shown in FIG. 6.

FIGS. 6 and 7 show an alternate embodiment for the invention. Mirrored surface 13, case 15 and bottom and cap 19 remain the same as described above. The guide rods 31 have a first threaded end for securement to the bottom end cap 19 via the nut 37. However, the opposite end of these rods is hook-shaped 53 for mating on to a hook-shaped fitting 55 formed as part of the top end cap 57.

The center edge of the top end cap 57 contains a rectangular opening 59 and a pair of hanger-hooks 61 extending inwardly on either side of this rectangular opening 59.

The handle 63 on the plastic sleeve 45 is "T" shaped with a pair of spurs 65 protruding near the end of the handle for engaging the hanger-hooks 61. This structure allows the cross bar 41 wiper 51 and handle 63 structure to be stored under the top end cap 57.

Many changes can be made in the above described structure without departing from the intent and scope thereof. It is therefor intended that the disclosure be interpreted as illustrative and not be taken in the limiting sense.

What is claimed is:

1. A self cleaning side view mirror assembly comprising:
    a reflective mirrored surface surrounded by a frame;
    a first elongate cap extending above said frame;
    a second elongate cap extending below said frame;
    a pair of guide rods extending between said first and second caps, one each at either side of said frame and in front thereof;
    a cross bar supported between said guide rods for sliding therealong; and
    a wiper carried on said cross bar and engagable with said mirrored surface.

2. The mirror assembly of claim 1 also including:
    a cylindrical sleeve mounted for rotation on said cross bar, said wiper being attached to the outer surface of said sleeve and extending its length; and
    a handle attached to said sleeve.

3. The mirror assembly of claim 2 also including a pair of detents, positioned one each near each end of said cross bar retaining said sleeve centered thereon.

4. The mirror assembly of claim 3 wherein said first cap and said second cap are each securedly attached to the back of said frame and each extend beyond said mirrored surface.

5. The mirror assembly of claim 4 also wherein said cross bar includes a bearing retaining cap at each end thereof containing a plurality of ball bearings which ride on a said respective guide rod.

6. The mirror assembly claim 5 wherein said first cap includes a pair of threaded fixtures, one each for receiving and holding an end of a respective guide rod.

7. The mirror assembly of claim 6 wherein said second cap includes a pair of circular holes there through, each for passing an end of a said respective guide rod;

and also including a unit for securing said respective passed guide rod end to said second cap 8. The mirror assembly of claim 7 wherein said first cap forms a curved shroud over said mirrored surface.

9. The mirror assembly of claim 8 also including a rubber insert in the center edge of said first cap.

10. The mirror assembly of claim 9 wherein said rubber insert is suitable for receiving and holding said handle.

* * * * *